(12) United States Patent
Elliott et al.

(10) Patent No.: US 8,045,264 B2
(45) Date of Patent: Oct. 25, 2011

(54) PROJECTION BACKWALL APPARATUS AND SYSTEM

(75) Inventors: John Elliott, Eagan, MN (US); Curtis Lindblom, Oakdale, MN (US)

(73) Assignee: Skyline Displays, Inc., Eagan, MN (US)

( * ) Notice: Subject to any disclaimer, the term of this patent is extended or adjusted under 35 U.S.C. 154(b) by 0 days.

(21) Appl. No.: 12/727,173

(22) Filed: Mar. 18, 2010

(65) Prior Publication Data
US 2010/0238544 A1    Sep. 23, 2010

Related U.S. Application Data

(60) Provisional application No. 61/162,046, filed on Mar. 20, 2009.

(51) Int. Cl.
*G03B 21/56* (2006.01)

(52) U.S. Cl. ........................ 359/443; 160/377

(58) Field of Classification Search .............. 359/443, 359/461; 160/377–378
See application file for complete search history.

(56) References Cited

U.S. PATENT DOCUMENTS

| | | | |
|---|---|---|---|
| 1,065,402 A * | 6/1913 | Stearns ..................... 38/102.8 |
| 2,631,915 A | 3/1953 | Wintersteen | |
| 3,300,088 A | 1/1967 | Steier et al. | |
| 3,500,569 A | 3/1970 | Simmons | |
| 3,583,466 A * | 6/1971 | Dreyer ........................ 160/351 |
| 3,987,737 A | 10/1976 | Smith | |
| 4,017,152 A | 4/1977 | Allen | |
| 4,106,852 A | 8/1978 | Chasins | |
| 4,110,003 A | 8/1978 | Zinn | |
| 5,125,193 A * | 6/1992 | Beaulieu | |
| 5,271,171 A * | 12/1993 | Smith ........................ 38/102.5 |
| 5,434,631 A | 7/1995 | Lieberman et al. | |
| 5,579,180 A | 11/1996 | Geller | |
| 6,012,688 A | 1/2000 | LaMotte | |
| 6,191,886 B1 | 2/2001 | Sinkoff | |
| 6,427,389 B1 | 8/2002 | Branc et al. | |
| 6,466,369 B1 | 10/2002 | Maddock | |
| 6,543,164 B1 | 4/2003 | Sperl et al. | |
| 6,785,047 B1 * | 8/2004 | Risher ........................ 359/443 |
| 6,870,670 B2 | 3/2005 | Gehring et al. | |
| 6,870,672 B2 * | 3/2005 | Stumpfl ....................... 359/443 |

(Continued)

FOREIGN PATENT DOCUMENTS

EP 0944798 B1 1/2003

(Continued)

*Primary Examiner* — Christopher Mahoney
(74) *Attorney, Agent, or Firm* — Larkin Hoffman Daly & Lindgren Ltd.; Thomas J. Oppold

(57) ABSTRACT

A collapsible projection backwall system utilizes a short throw projector and a collapsible framework to create a display usable in a small amount of space. The framework is specifically configured to support and appropriately position a flexible screen member so that distortion is avoided. This is particularly significant in situations where a relatively large screen is utilized, which creates the need to maintain appropriate tension upon the flexible screen member. The framework is specifically configured to be slightly canted when in its extended configuration to thereby introduce natural tension forces which will cooperate with the screen fabric to maintain the necessary configuration for the screen. This canted configuration is achieved by configuring a set of corner hinge assemblies and any central hinged assemblies to maintain this natural cant. By maintaining the desired forces on the display screen fabric a more efficient and functional display screen is created.

21 Claims, 17 Drawing Sheets

U.S. PATENT DOCUMENTS

| | | |
|---|---|---|
| 6,981,350 B1 | 1/2006 | Redmon |
| 7,024,834 B2 | 4/2006 | Gimpel et al. |
| 7,185,861 B2 | 3/2007 | LaMotte |
| 7,236,695 B1 | 6/2007 | Demos |
| 7,316,257 B2 | 1/2008 | Cameron et al. |
| 7,337,567 B2 | 3/2008 | Fritsche |
| 7,396,133 B2 | 7/2008 | Burnett et al. |
| 7,489,444 B1 | 2/2009 | Adams et al. |
| 7,933,068 B2 * | 4/2011 | Peterson et al. ............ 359/443 |
| 2002/0163720 A1 | 11/2002 | Piepel et al. |
| 2005/0200951 A1 | 9/2005 | Redmon |
| 2006/0187544 A1 | 8/2006 | Wiener et al. |
| 2006/0244731 A1 | 11/2006 | Mulleris |
| 2008/0030853 A1 | 2/2008 | Creel |
| 2008/0169403 A1 | 7/2008 | Rooney |
| 2009/0007473 A1 | 1/2009 | Gimpel et al. |
| 2010/0053746 A1 * | 3/2010 | Seymour ...................... 359/443 |
| 2010/0079860 A1 * | 4/2010 | Unno et al. .................. 359/443 |

FOREIGN PATENT DOCUMENTS

| | | |
|---|---|---|
| FR | 2177155 A5 | 11/1973 |
| WO | WO9819100 A1 | 5/1998 |
| WO | WO02097530 A1 | 12/2002 |
| WO | WO2007094843 A1 | 8/2007 |
| WO | WO2008043553 A2 | 4/2008 |
| WO | WO2008043553 A3 | 4/2008 |
| WO | WO2008059345 A2 | 5/2008 |

* cited by examiner

PROJECTION BACKWALL APPARATUS AND SYSTEM

CROSS-REFERENCE TO RELATED CASES

This application claims the benefit of previously filed U.S. Provisional application 61/162,046, filed Mar. 20, 2009 and entitled "Projection Backwall Apparatus and System".

BACKGROUND

Display exhibits and booths used at tradeshows and exhibitions are preferably easily transportable, are preferably quickly and easily erected and collapsed, and are preferably light weight for ease of portability and to reduce shipping costs. Additionally, the area available to each exhibitor at tradeshows and exhibitions is limited. Accordingly, exhibitors desire to maximize the limited space available to them.

A common feature used by exhibitors is a backwall, which may be a simple hanging curtain, or a series adjacent retractable banners such as disclosed in U.S. Pat. No. 7,337,567 issued to Skyline Displays, Inc., or self supporting frames or structures with fabric or rigid panels. The backwall serves two primary purposes. First, it provides a large prominent surface on which company logos, promotional materials and images of the company's products, services or other eye-catching images may be displayed to attract visitors to the exhibitor's display area. Second the backwall serves to conceal extra promotional materials, supplies, packaging, containers and other items that the exhibitor does not want visitors to be able to view or access.

The space available behind the backwall is generally very limited because tradeshow rules often require display backwalls to be no more than three feet from the facility's walls or other structures, so that one exhibitor's backwall does not block the display of neighboring exhibitors. In any event, exhibitor's typically want to have the backwall as far back as possible to provide adequate space in front of the backwall for tables, chairs and other furnishings on which to display promotional materials and to provide adequate free space to allow exhibitor representatives and visitors to easily move around to view the promotional items and to mingle and discuss business.

Many exhibitors desire to project images on the backwall of their display area, such as their company logo, or other eye-catching images to promote their products or services and to attract visitors to the display area. Until the relatively recent development and availability of short-throw, wide angle projectors, most exhibitors that wanted to project an image on a backwall of their booth or display, they had to use a conventional front projection system which required the projector to be placed toward the front of the display area or booth in order to produce a large image on the backwall. However, when placing the projector at the front of the display area, shadows would be produced blocking the projected image anytime someone walked between the projector and the backwall.

With the relatively recent development and commercial availability of short-throw, wide angle projectors, exhibitors are now able to place the short-throw projector within a few feet of the backwall while still producing a large image on the backwall, thus significantly reducing the chance that the projected image will be blocked by shadows from people walking between the projector and backwall. However, with such systems, the short-throw projector still takes up valuable space within the display area that could be used for other purpose.

Furthermore, although rear projection screens are known and although rear projection screens would overcome the foregoing disadvantages of a conventional front projection system as well as a short-throw front projection system, the use of rear projection systems at tradeshows or exhibitions has been uncommon and heretofore unpractical, at least for most exhibitors, due to the cost and difficulty of setup of rear projection systems to produce a distortion free image. It should be appreciated that in order to produce an image on a rear projection screen that is not distorted, the screen must be planar and must be uniformly stretched without any distortions. The need for planarity and lack of distortion is due to the unique optically transmissive and light diffusive characteristics of rear projection screens which permit the image to be viewed through the screen, as opposed to being reflected as with a front projection screens.

Accordingly, there is a need for a relatively inexpensive projection backwall for use at tradeshows, exhibitions, and the like, which is collapsible and relatively light weight for ease of portability and which is quickly and easily erectable and collapsible, and, when erected, results in a substantially planar and distortion free surface that is able to display substantially distortion free projected images.

DETAILED DESCRIPTION

Figure 1:
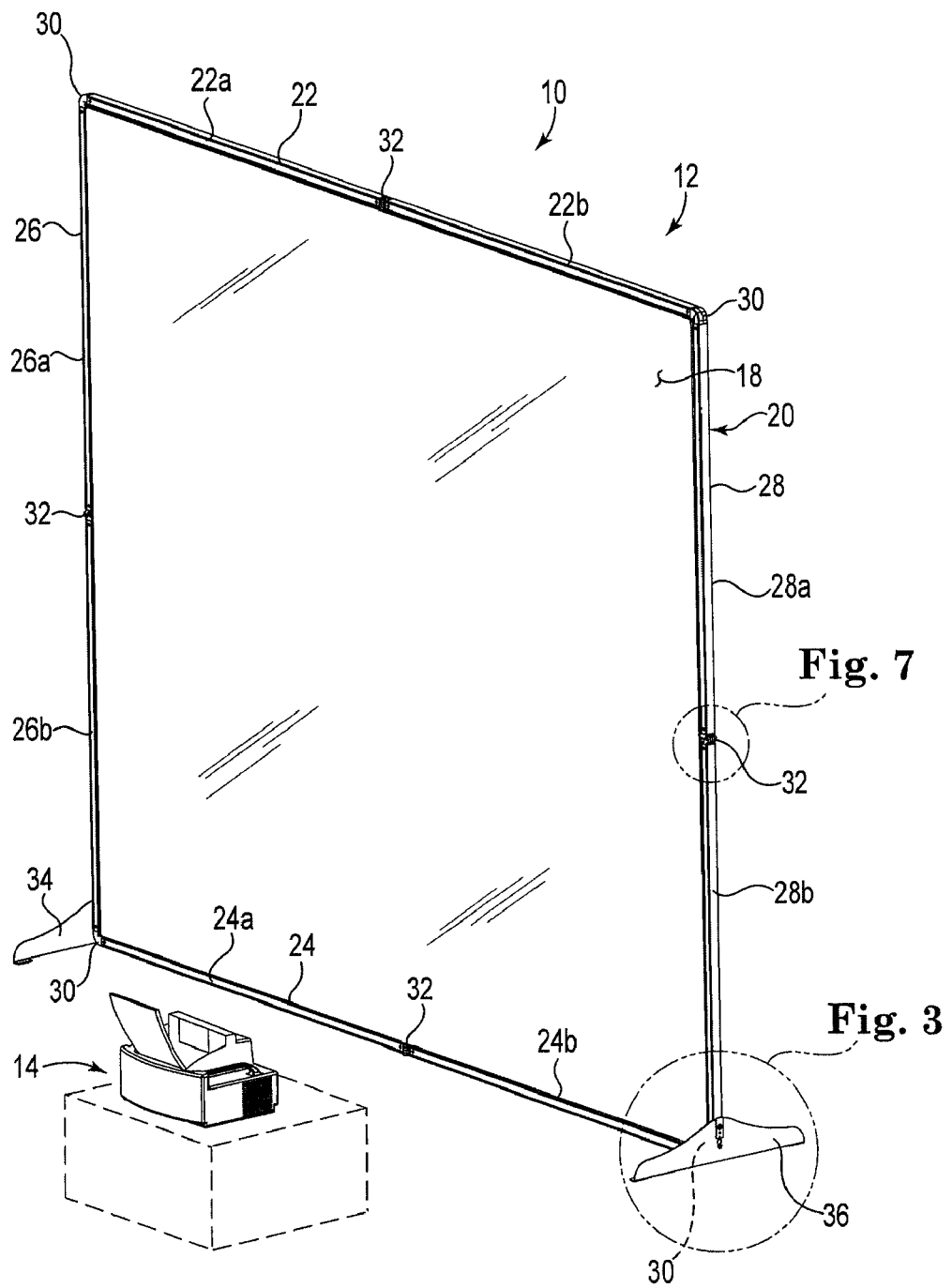
FIG. 1 is a perspective view of an embodiment of a projection backwall system with an embodiment of projection screen and an embodiment of a short-throw, wide-angle projector.
Figure 2:
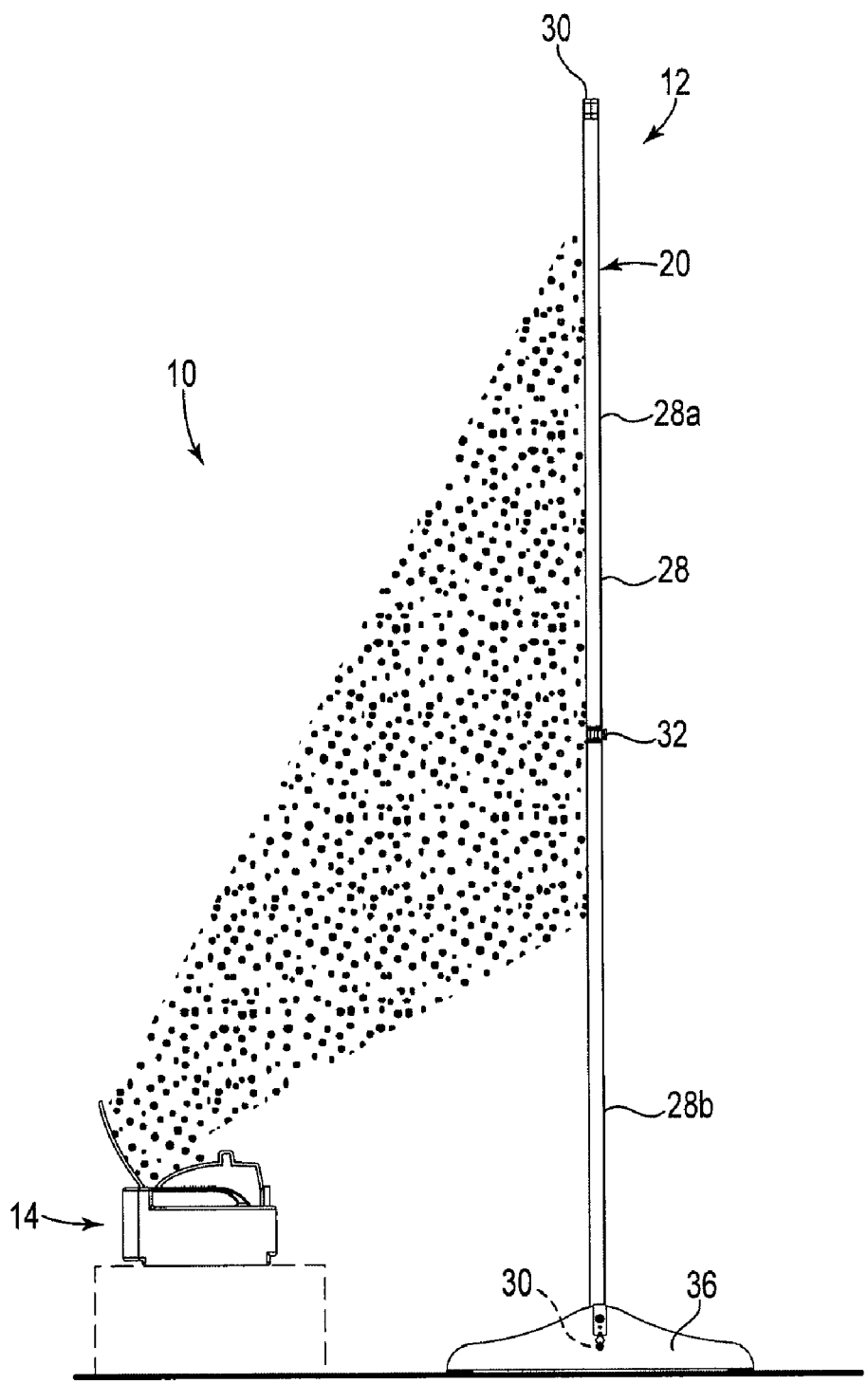
FIG. 2 is a side elevation view of the projection backwall system of FIG. 1 and illustrating an imaging being projected by the projector on the projection screen.

Referring now to the drawings, wherein like reference numerals designate identical or corresponding parts throughout the several views, FIG. 1 is a perspective view of a preferred embodiment of a projection backwall system designated generally by reference numeral 10. The projection backwall system 10, comprises a projection screen 12 and preferably a short-throw, wide angle projector 14, such as an NEC® WT Series mirror projector, which is capable of projecting a large image on a screen from a relatively close distance. FIG. 2 is a side elevation view of the system 10 illustrated in FIG. 1 showing the projector 14 projecting an image on the projection screen 12.

It should be appreciated that although the projection backwall system 10 is particularly suited for tradeshows and similar events, the projection screen 12 may be used with conventional front projectors whether for in-home use, schools, business settings or for any other event where ease of screen setup and portability is desired, or if space is limited, the projection screen 12 may be used with short-throw, wide-angle front or rear projectors.

The projection screen 12 preferably comprises a stretch-fabric material 18, such as Lycra®, that is preferably removably secured to a collapsible frame 20. For rear projection applications, the stretch-fabric material 18 is preferably a translucent, high-density fabric suitable for short-throw, wide-angle rear projections. This same material may be suitable for front projection applications as well, or a material with more reflective characteristics may be equally or better suited.

The frame 20 preferably includes upper and lower horizontal frame members 22, 24, and left and right vertical frame members 26, 28. The frame members 22, 24, 26, 28 are preferably extruded tubular shapes, preferably of aluminum or other lightweight and suitably rigid material. The preferred cross-section of the extruded tubular shapes can be seen in FIGS. 3 and 8.

In the preferred embodiment, the upper and lower horizontal frame members 22, 24 preferably comprise a pair of horizontal members 22a, 22b and 24a, 24b, respectively, which are connected at one end with a middle hinge assembly 32. Similarly, the left and right vertical members 26, 28 preferably comprise a pair of vertical members 26a, 26b and 28a, 28b, respectively, which are also connected at one end by a middle hinge assembly 32. The horizontal and vertical frame members are preferably connected at their free ends by four corner hinge assemblies 30, thereby forming a parallelogram-like configuration (discussed later). It should be appreciated that depending on the size of the projection screen 12 desired, the frame 20 may consist of more or fewer horizontal and vertical frame members. For example, if a smaller screen is desired, it may be suitable to use only four horizontal and vertical frame members joined by four corner hinge assemblies 30, thus eliminating the need for the middle hinge assemblies 32. Alternatively, if a larger screen is desired, three or more upper and lower horizontal members and two or more vertical frame members may be used, thereby requiring six, eight or more middle hinge assemblies 32.

A pair of feet 34, 36, are preferably removably secured to the frame 20. The feet 34, 36 should be of sufficient length to laterally support the frame 20 so that it is stable and does not easily tip. It should be appreciated that the length of the feet may need to vary depending on the vertical height of the frame 20 to provide greater lateral stability.

Figure 3:
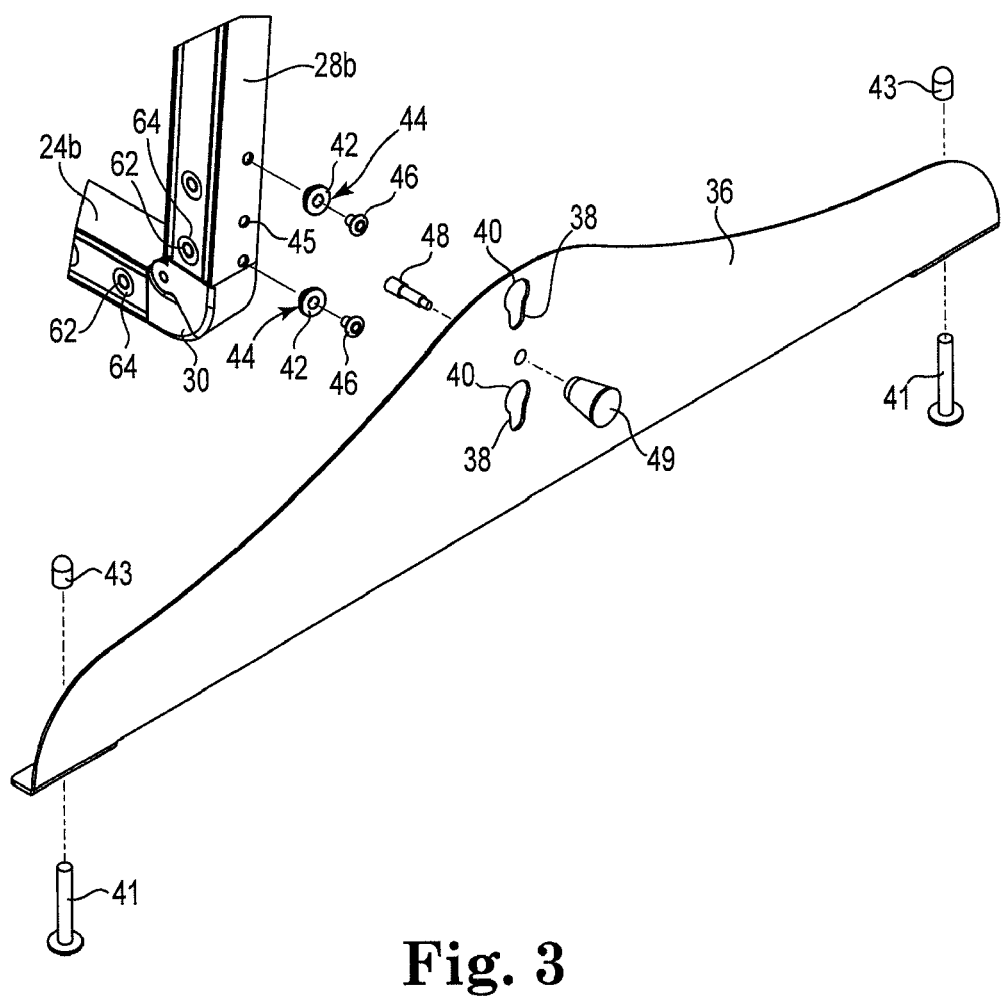
FIG. 3 is an exploded and enlarged perspective view of the corresponding area circled in FIG. 1 illustrating a preferred method of assembling the corner and foot attachment for the projection screen frame.

FIG. 3 is an exploded perspective view illustrating a preferred embodiment for removably attaching the feet 34, 36 to the frame 20. Although only one foot is discussed, it should be understood that the same description applies to each foot. The foot 36 preferably includes a pair of spaced slots 38 each slot having an enlarged lobe 40 to receive the heads 42 of pins 44.

Figure 15:
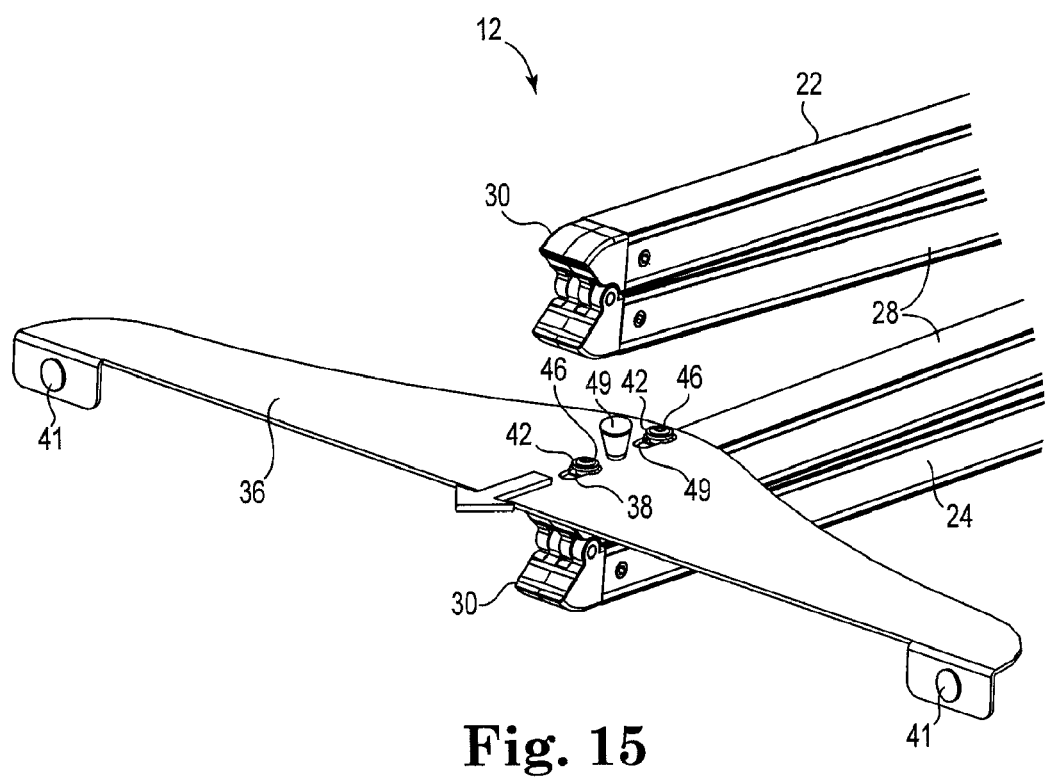

The pins 44 are preferably fixed to the frame 20 by pop-rivets 46, threaded fasteners or other suitably strong connection. In addition, a spring loaded pin 48 is included, which is attached to foot member 36. Spring loaded pin 48 has a knob 49 attached at one end which allows for movement against the force of an internal spring (not shown). During mounting, knob 49 is pulled, causing pin 48 to withdraw so pins 44 can be coupled within slots 38. Once approximately positioned, pin 48 will seat in hole 45, thereby locking feet 36 in place. An alternative embodiment could use a flexible locking plate affixed to foot 36 having circular apertures to receive and lock with a related pin, or other locking mechanisms. As best illustrated in FIG. 15, in order to remove the foot 36, the pin 48 is pulled back releasing the pin head 42 from the aperture 45 which allows the pins 44 to slide upwardly out of the slots 38 and the pin heads 42 to be pulled through the enlarged lobes 40.

Figure 4:
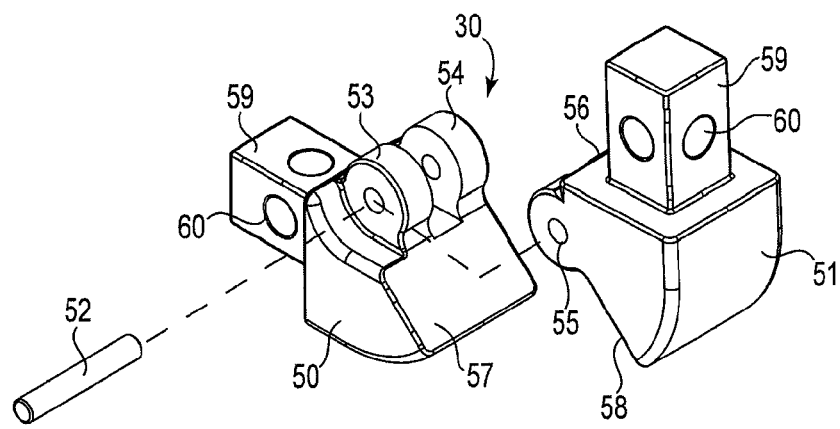
FIG. 4 is an exploded perspective view of an embodiment of a frame corner hinge assembly.
Figure 5:
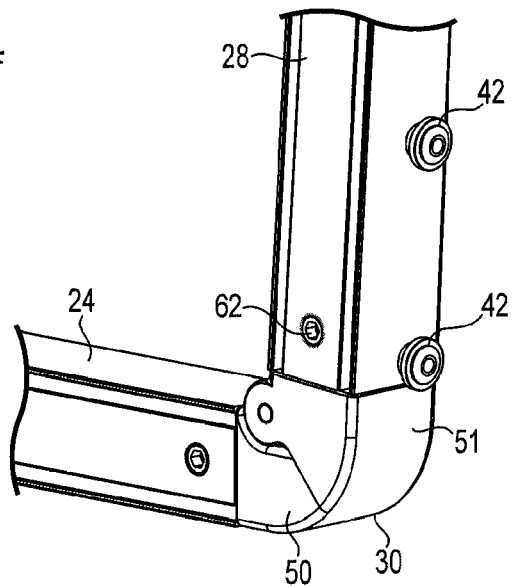
FIG. 5 is a perspective view of the corner hinge assembly of FIG. 4 shown assembled and secured to frame members in the fully open position and with the foot removed for clarity.
Figure 6:
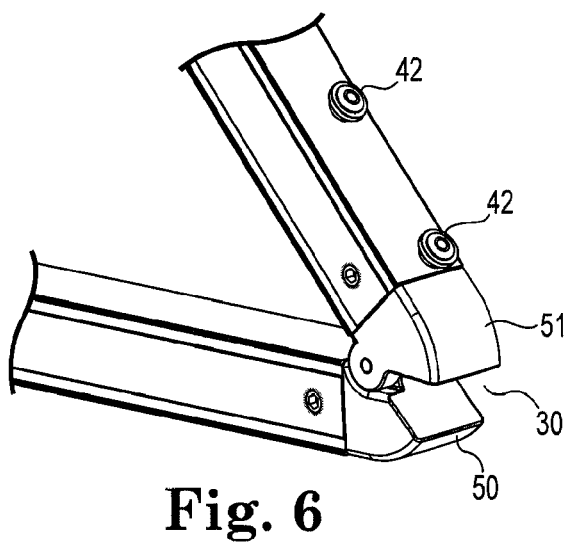
FIG. 6 is a perspective view of the corner assembly of FIG. 5 in the partially folded position.

An exploded perspective view of the corner hinge assembly 30 is illustrated in FIG. 4. The corner hinge assembly 30 includes two hinge members 50, 51 which are pivotally connected by a pin 52 extending through mating offset ears 53, 54, 55, 56. Each hinge member 50, 51 further includes an abutting face 57, 58 preferably sloped at approximately forty-five degrees (discussed later) so as to produce approximately a ninety degree corner when the frame 20 is unfolded. A leg 59 extends from each hinge member 50, 51. Recesses 60 are disposed in each leg 59. As best illustrated in FIG. 3, the legs 59 are preferably received within the frame members 22, 24, 26, 28 and secured by a threaded connector 62 (FIG. 3) threaded into an aperture 64 in the frame member which engages the recess 60 to lock the legs 59 within the frame members. FIGS. 5-6 illustrate how the corner hinge assemblies 30 pivot when moving from the open position FIG. 5 to the partially folded position FIG. 6.

Figure 7:
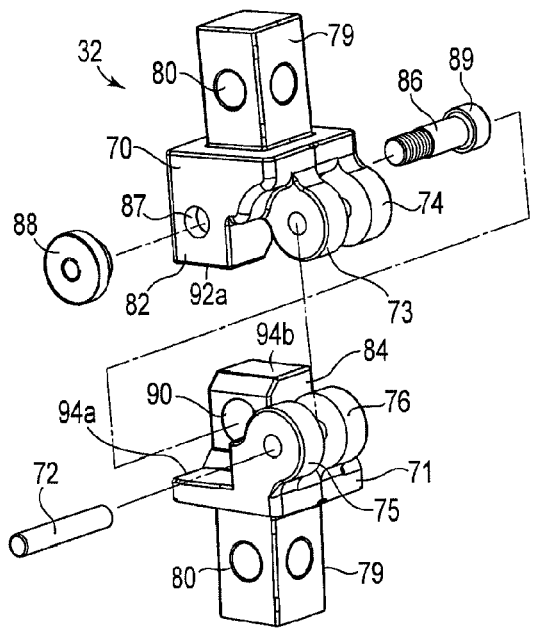
FIG. 7 is an exploded and enlarged perspective view of the corresponding area circled in FIG. 1 illustrating an embodiment of a frame middle hinge assembly.

An exploded perspective view of the middle hinge assembly 32 is illustrated in FIG. 7. The middle hinge assembly 32 includes two hinge members 70, 71 which are pivotally connected by a pin 72 extending through mating offset ears 73, 74, 75, 76. A leg 79 extends from each hinge member 70, 71. The legs 79 are preferably received within the frame members 22, 24, 26, 28 and secured by a threaded connector 62 (FIG. 8) threaded into an aperture 64 in the frame member and received by the recess 80 to lock the legs 79 within the frame members.

Figure 8:
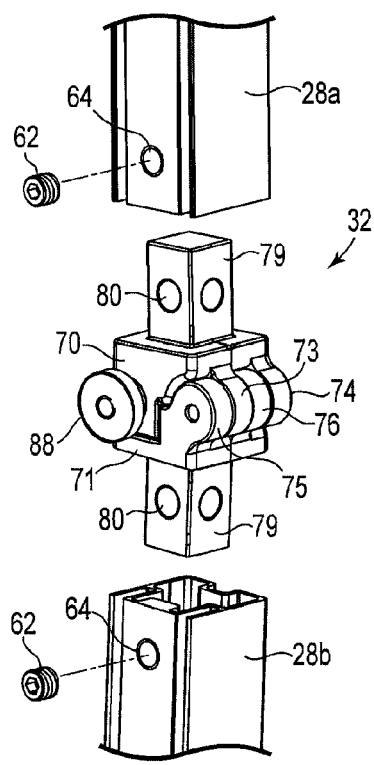
FIG. 8 is an exploded perspective view of the assembled frame middle hinge assembly of FIG. 7.
Figure 9:
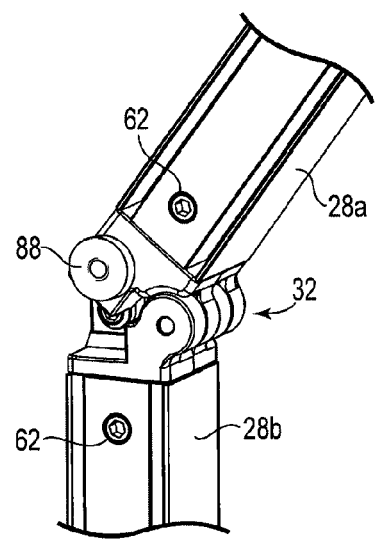
FIG. 9 is a perspective view of the middle hinge assembly of FIG. 8 shown in the partially folded position.
Figure 11:
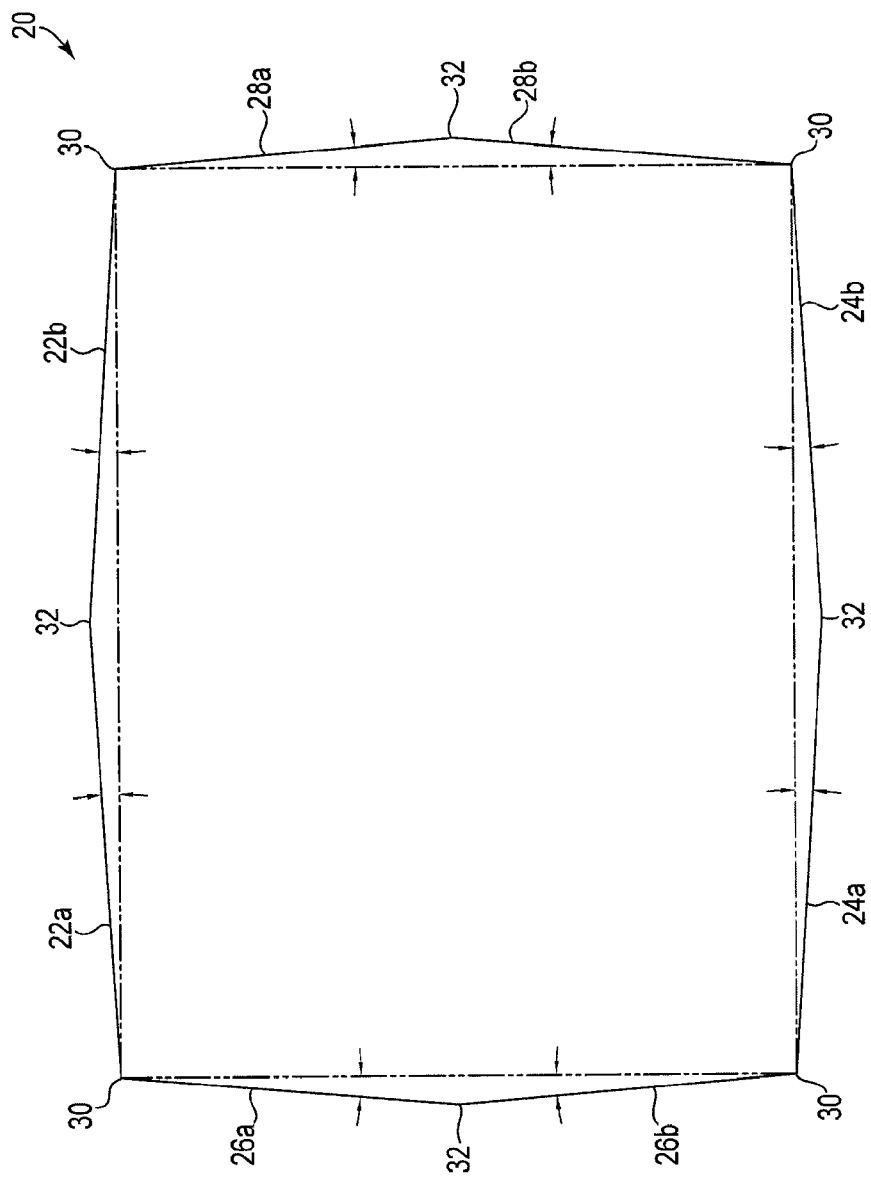
FIG. 11 is a schematic diagram illustrating the configuration of the frame (exaggerated for clarity) before the stretch fabric is applied which draws the angled hinged frame members inward resulting in substantially planar and distortion free projection screen.

Each hinge member 70, 71 further includes offset opposing blocks 82, 84. A locking pin 86 is slidably movable within a first bore 87 extending through the first block 82. A knob 88 is threadably secured to one end of the pin 86 on the exterior of the hinge assembly 32. The other end of the pin 86 includes a head 89 that is larger than the first bore 87, such that with the knob 88 secured to the other end of the pin 86, the pin cannot be pulled out of the first block 82. The second block 84 includes a second bore 90 sized to receive the head 89 of the locking pin 86. The second bore 90 is substantially coaxial with the first bore 87 when the hinge assembly 32 is assembled as shown in FIG. 8. Thus, it should be appreciated that by pushing on the knob 88, the head 89 of the locking pin 86 slidably extends into the second bore 90 thereby locking the first and second hinge members 82, 84 together with the frame members in substantial longitudinal alignment. To unlock the hinge members thereby permitting the frame members to fold as illustrated in FIGS. 9 and 11, the knob 88 is pulled outwardly, thereby slidably withdrawing the head 89 from the second bore 90. In the locked position, it should be appreciated that the transverse surfaces 92a, 92b, 94a, 94b of the respective opposing blocks 82, 84 abut one another. The abutting surfaces are preferably approximately perpendicular to a longitudinal axis for reasons which will be discussed in more detail later.

Figure 10:
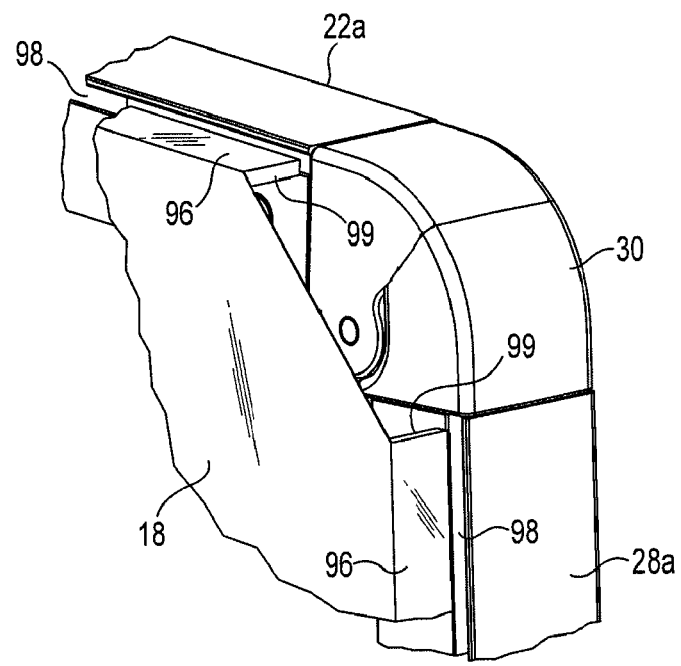
FIG. 10 is an enlarged partial perspective view illustrating a preferred embodiment for attaching the stretch fabric to the frame and for spanning the corner hinge and middle hinge assemblies.
Figure 10:
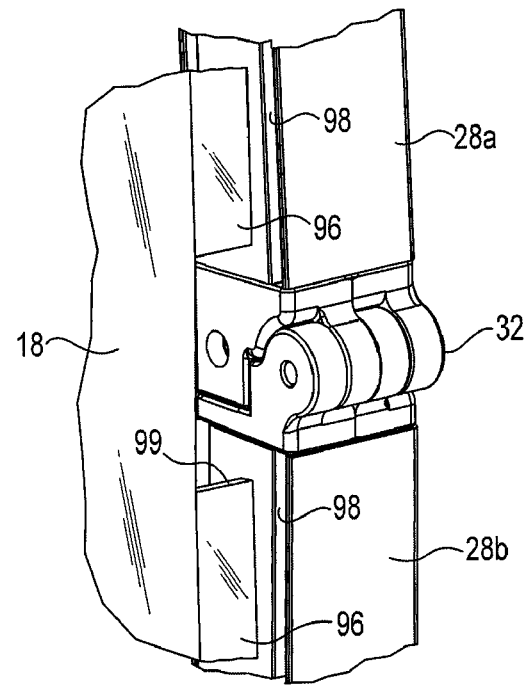

FIG. 10 illustrates a method of attaching the stretch-fabric screen 18 to the frame members 22, 24, 26, 28. As illustrated, the stretch-fabric screen 18 preferably includes an outer peripheral flange 96 that is frictionally received within channels 98 extending along the length of the frame members 22, 24, 26, 28. A break in the peripheral flange 96 is provided at each middle hinge assembly 32 and at each corner hinge assembly 30 as illustrated. The flange 96 is preferably comprised of a plurality of elongated rectangular flange members 99 secured to the stretch fabric 18. The members 99 are preferably made of vinyl or other suitable material that it is lightweight, longitudinally flexible and resilient, yet somewhat rigid or stiff in the lateral direction. The stretch-fabric 18 may be secured to the flange members 99 by stitching, by adhesive, by providing pockets into which the flange members 99 are received or by any other suitable attaching method. As previously indicated, the flange sections 96 are frictionally received within the channels 98 so that the fabric screen 18 is securely yet removably secured to the frame 20.

Figure 21:
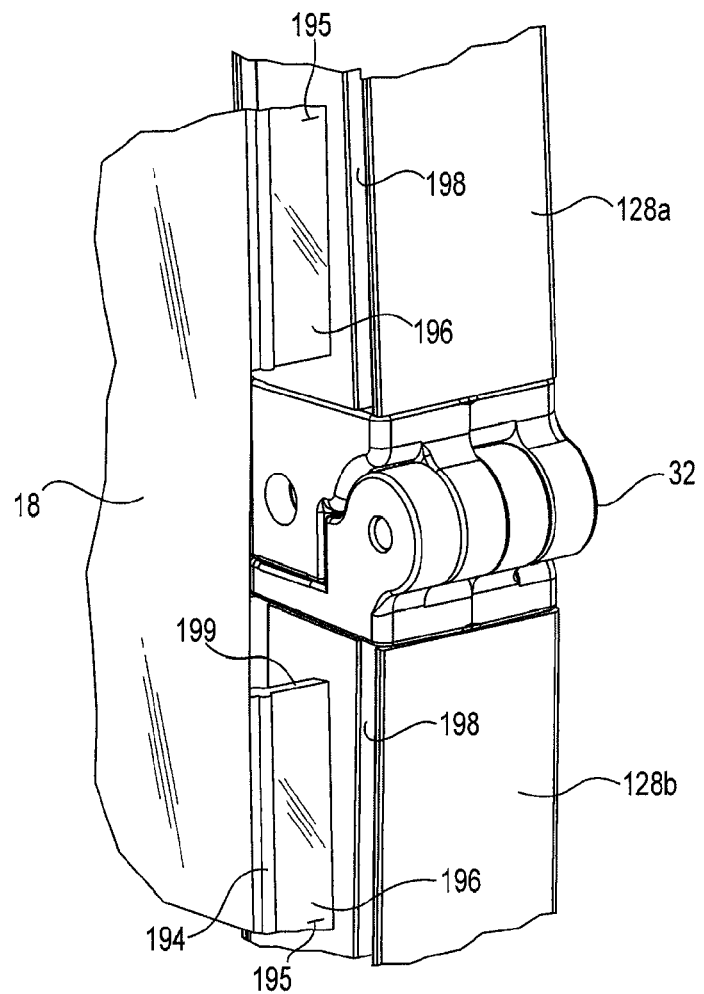
FIGS. 21 and 22 are enlarged partial perspective views illustrating another embodiment of the structure for attaching the stretch fabric to the frame.
Figure 22:
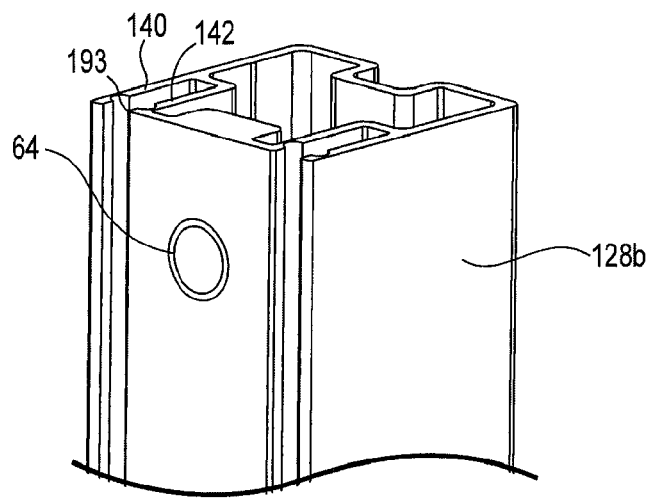

FIGS. 21 and 22 illustrate an alternative embodiment for attaching the stretch-fabric screen 18 to frame members 128a and 128b. As shown, the stretch-fabric screen 18 includes a ridged peripheral flange 196 that is received within a mating channel 198 extending along the length of the frame members 128a, 128b. As in the previous embodiment, the ridged peripheral flange 196 is preferably made of vinyl or other suitable material that it is lightweight, longitudinally flexible and resilient, yet somewhat rigid or stiff in the lateral direction. The ridged flange 196 includes a ridged flange member 199 which has outwardly projecting ribs 194 positioned a distance from the flange end 195. The sidewalls 190 and 192 of the mating channel 198 include a mating recess 193 to receive the ribs 194. It should be appreciated that the width of the opening of the mating channel 198 is greater than the width of the flange end 195 but less than the width of the outwardly projecting ribs 194 of the flange member 199 so as to create an interference fit. In use, the end portion 195 of the flange 196 is first inserted into the channels 198 temporarily holding the screen to the frame. The ridged flange 199 is then pressed into the mating recess 193 to securely seat the flange into the channel with an interference fit.

FIG. 11 provides an exaggerated illustration of a preferred configuration of the frame 12 prior to attaching the stretch fabric screen 18. It should be appreciated that the greater the span between corner hinge assemblies and the tighter the stretch fabric 18 is stretched, the greater will be the tendency for the frame members to bow inwardly toward the middle of the span, resulting in the screen 18 being less taut toward the middle thereby distorting the projected image. To account for the bowing of the frame 20 so that the screen 18 has substantially the same tautness along its length and height, the middle hinge assemblies 32 and corner hinge assemblies 30 are preferably configured to cant the frame members 22, 24, 26, 28 outwardly at the midpoints so that when the screen 18 is attached, the force exerted by the stretch-fabric 18 will pull the frame members inwardly to produce a more true parallelogram-shaped backwall with substantially square corners and substantially parallel opposing sides resulting in a substantially distortion free projected image. It should be appreciated that the amount of canting required for the frame members will vary depending on the size of the frame, the tautness of the screen 18, and the amount of play in the middle and corner hinge assemblies due to manufacturing tolerances.

Figure 12:
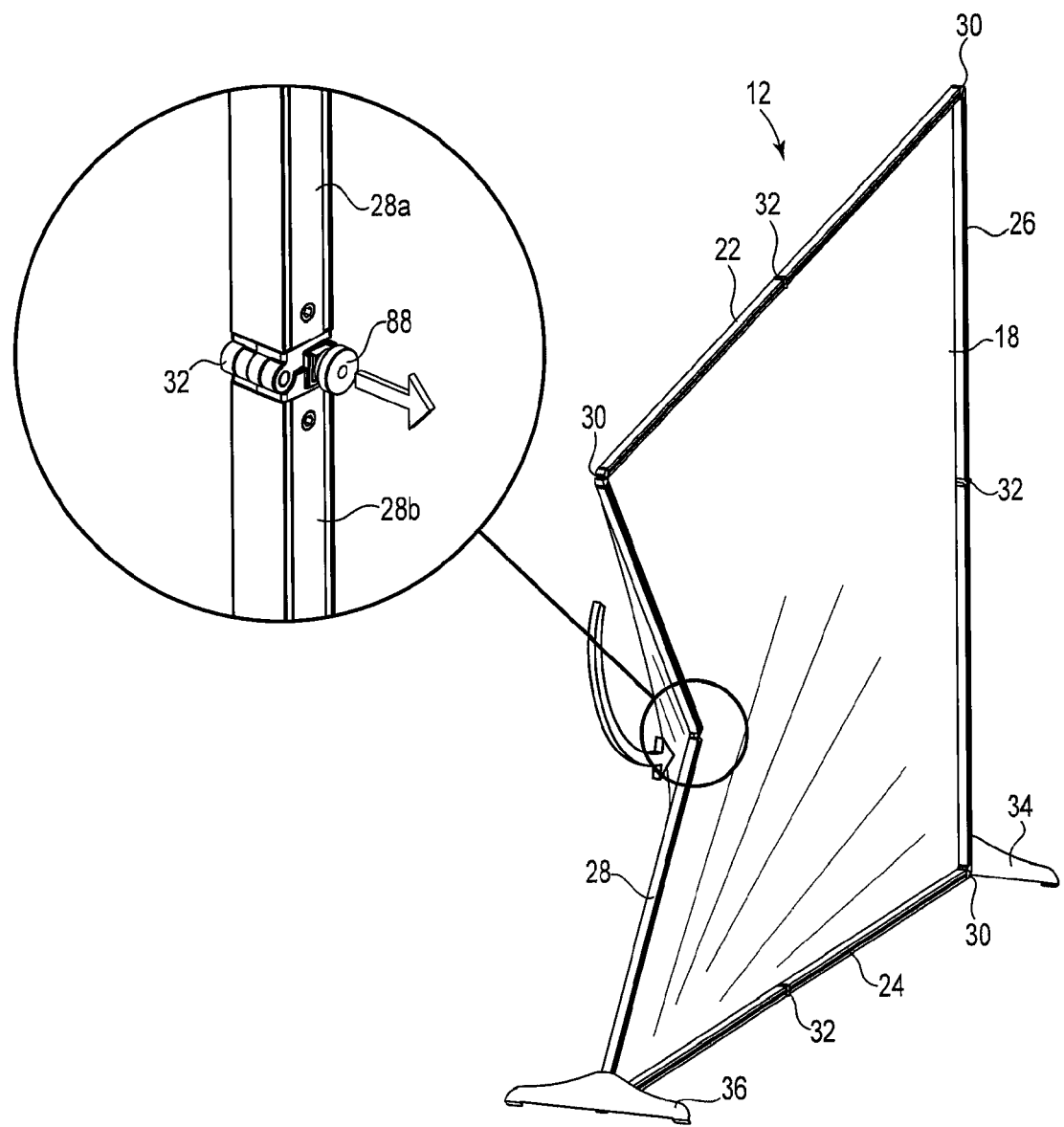
FIGS. 12-20 illustrate how the projection backwall of FIG. 1 may be erected and folded.
Figure 13:
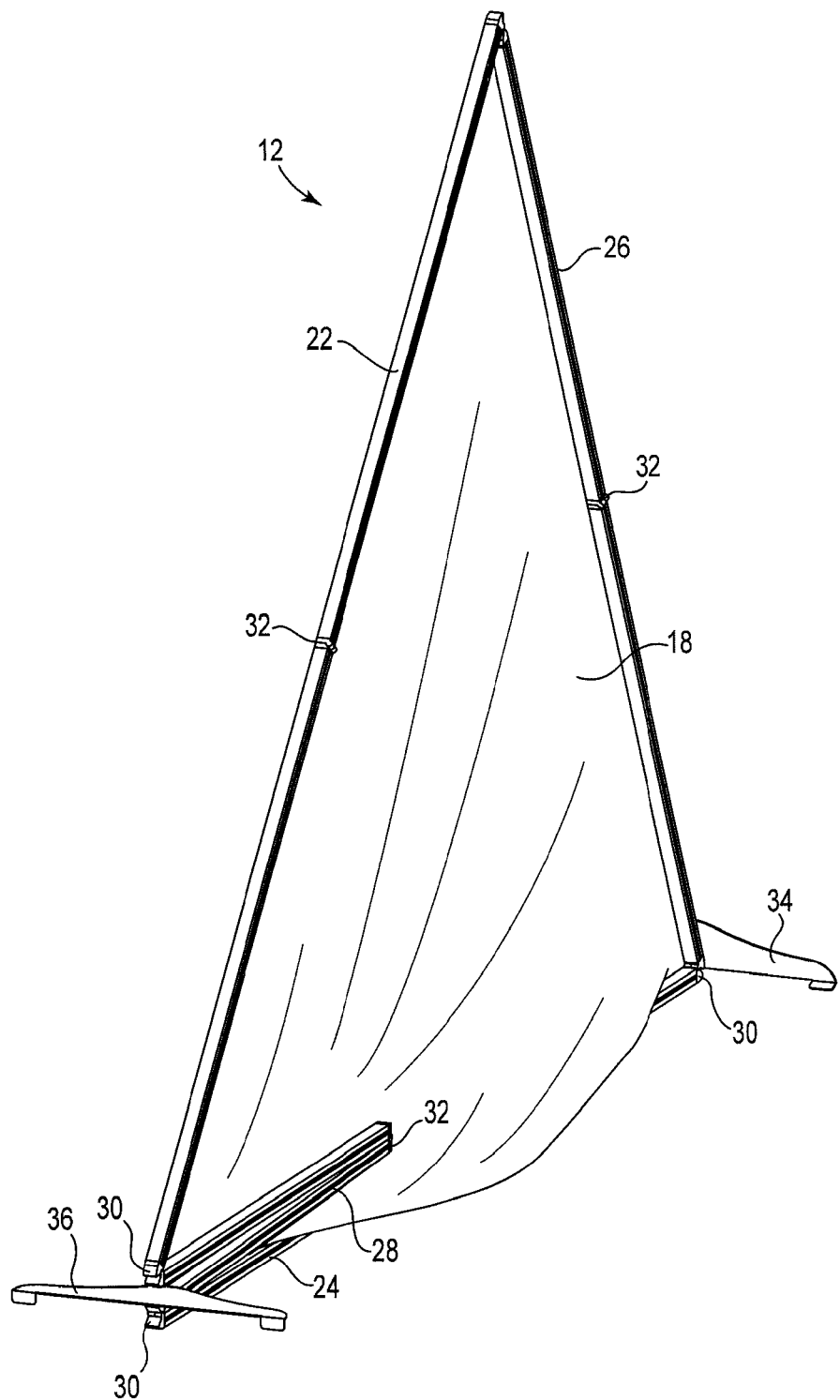
Figure 14:
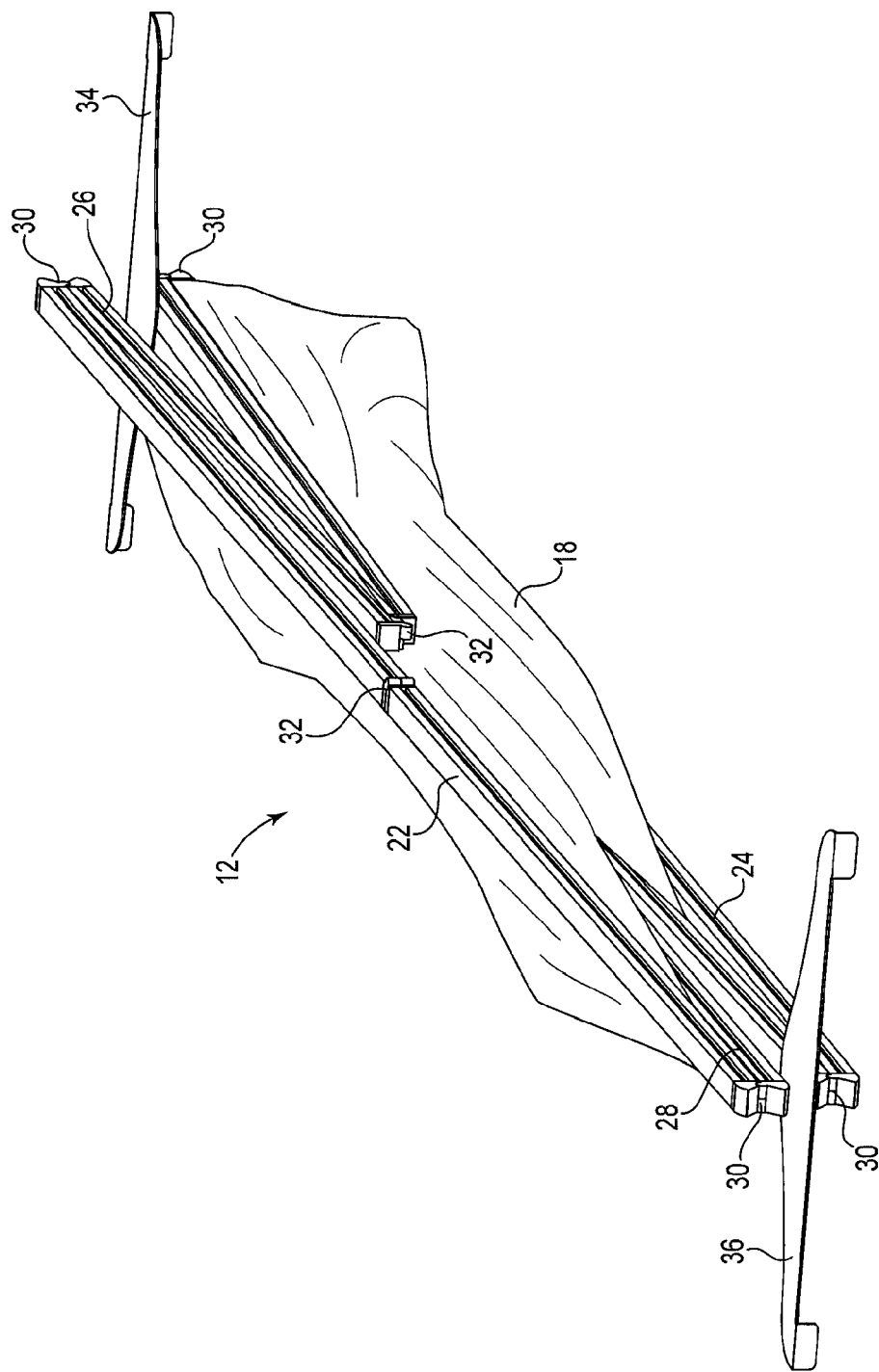
Figure 16:
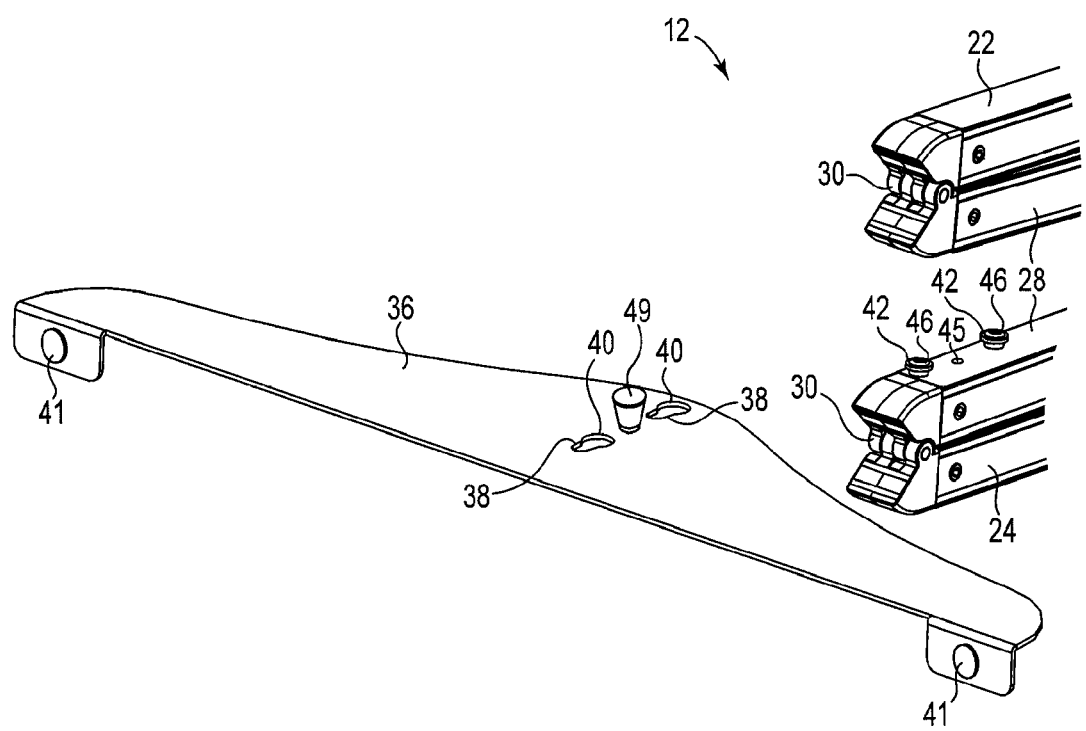
Figure 17:
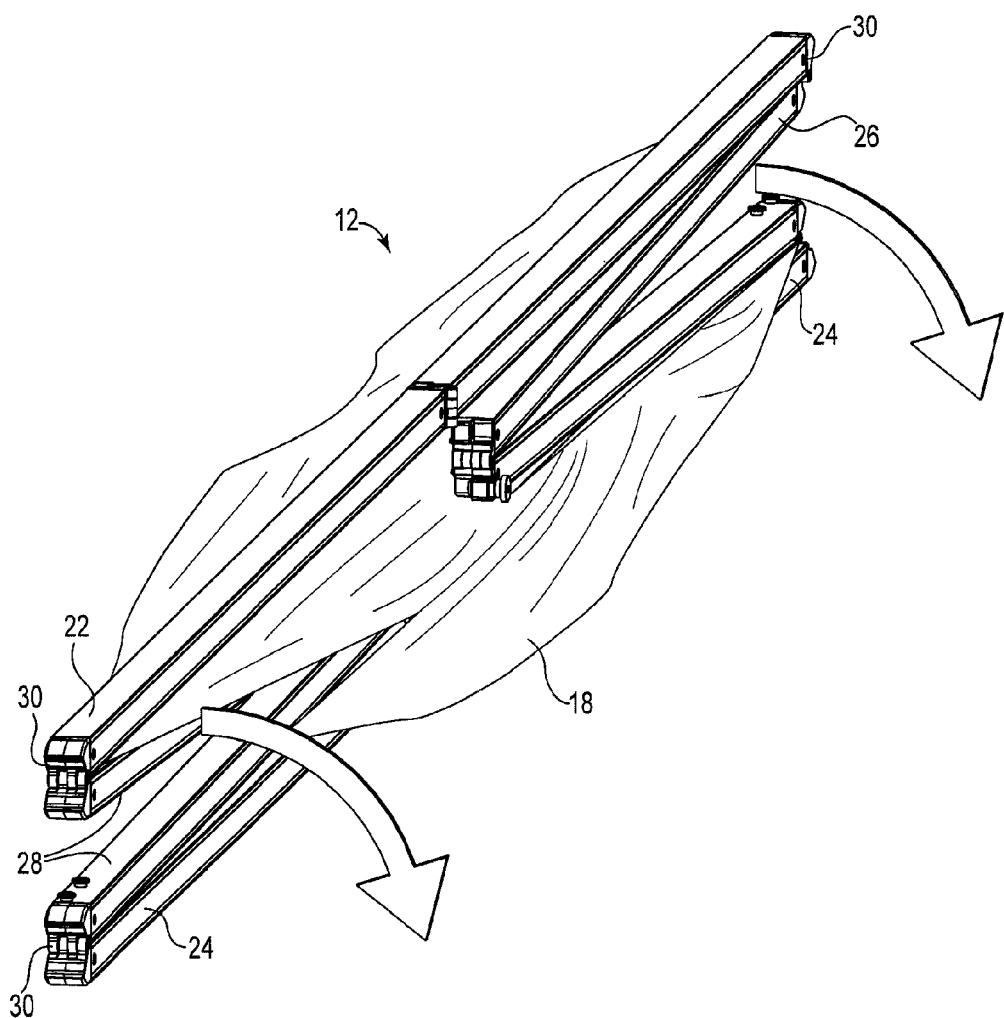
Figure 18:
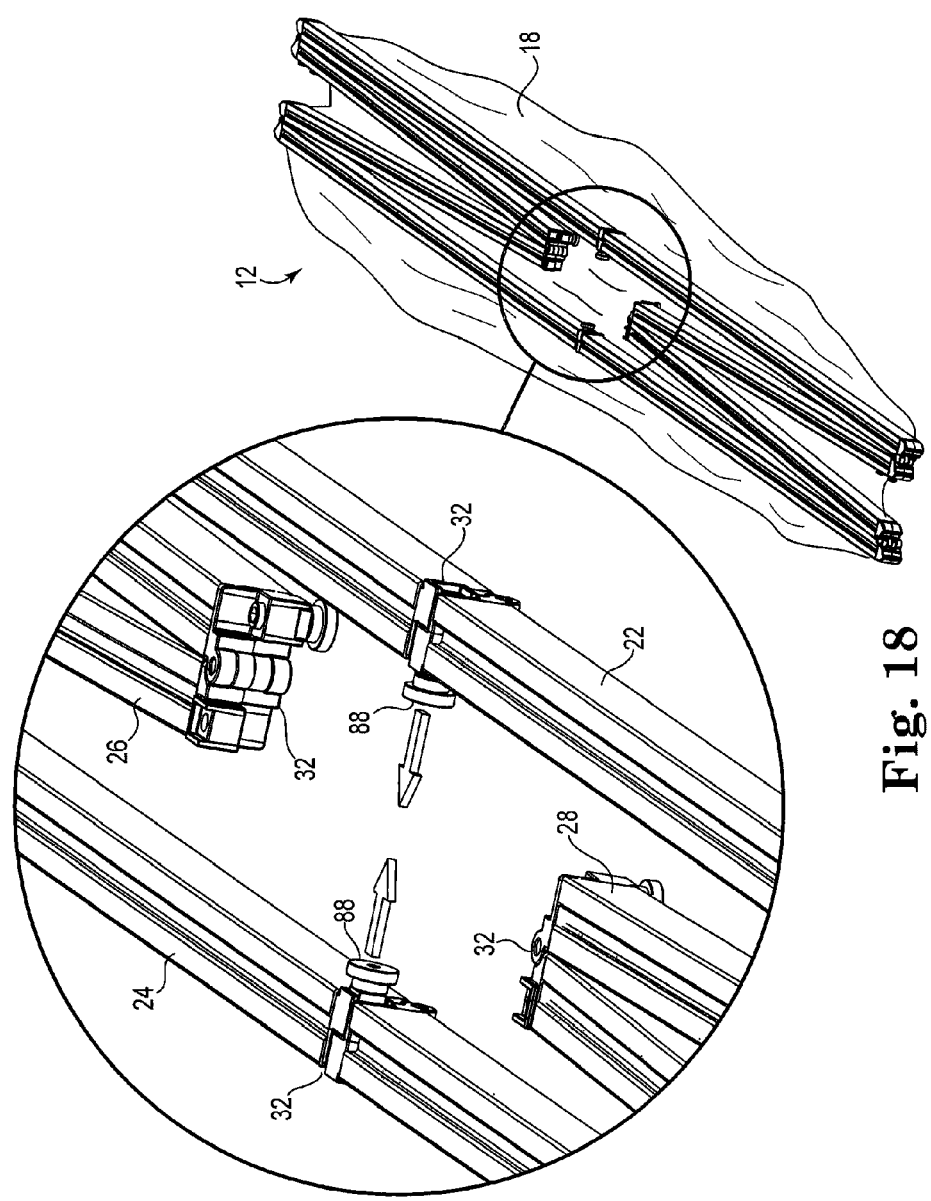
Figure 19:
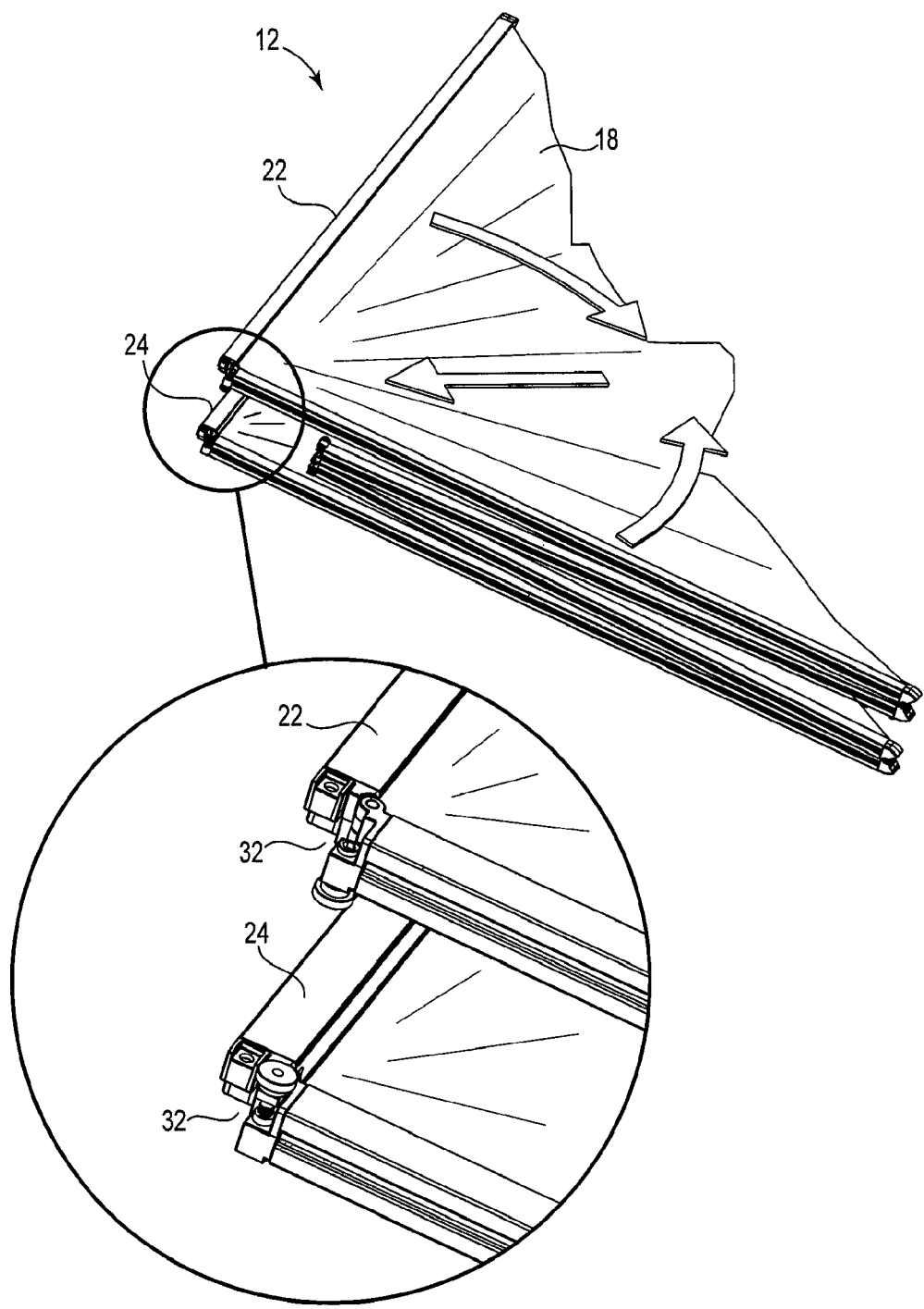
Figure 20:
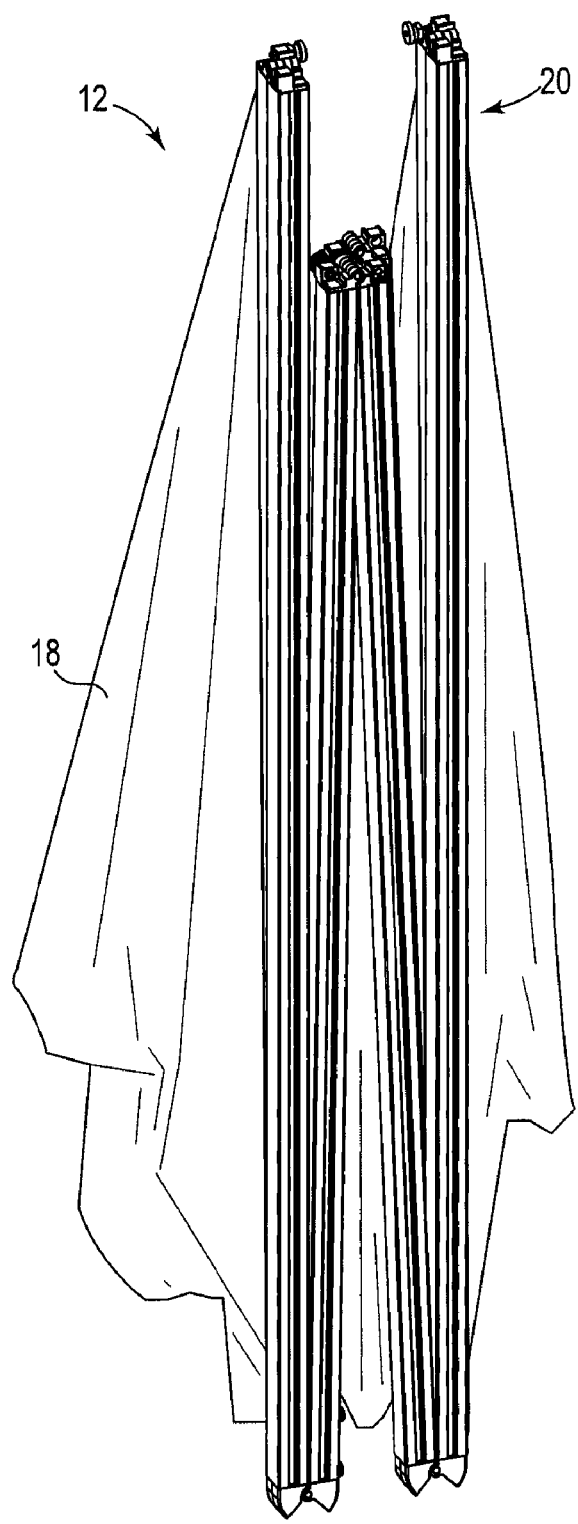

FIGS. 12-20 illustrate the preferred steps for collapsing or folding the backwall 12. As illustrated in FIGS. 12 and 13, to begin collapsing or folding the backwall 12, the vertical frame members 28a, 28b are unlocked by pulling the knob 88 on the middle hinge assembly 32 outwardly. The same operation is performed on the other vertical frame members 26a, 26b. As illustrated in FIGS. 14-16, once the vertical frame members 26, 28 are collapsed, the feet 34, 36 are removed from the backwall frame 20 as previously described. Referring now to FIGS. 17-19, the top and bottom frame members 22, 24 are folded by pulling on the knobs 88 of the middle hinges 32 and bending the frame members 22a, 22b and 24a, 24b toward one another. The fully collapsed backwall 12 is illustrated in FIG. 20.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A projection backwall system, comprising:
a projector projecting an image; and
a projection screen comprising a frame moveable between a collapsed condition and a display condition, the frame comprising a plurality of substantially linear frame members, each of the frame members hingedly connected to an adjacent one of the plurality of frame members forming a substantially planar polygonal configuration wherein at least two adjacent hingedly connected frame members are canted outwardly within the plane when in the display condition, a stretch fabric attached to the frame, the stretch-fabric sized to cooperate with the frame members so that the outwardly canted frame members are pulled inwardly along the plane to provide a substantially planar, distortion free surface, the projection screen when in the display condition disposed to display the projected image.

2. The projection backwall system of claim 1 wherein the frame includes a plurality of hinge assemblies.

3. The projection backwall system of claim 2 wherein each frame member has a recess configured to receive a leg of the corresponding hinge assembly.

4. The projection backwall system of claim 2 wherein the hinge assemblies include a plurality of corner hinge assemblies, each corner hinge assembly including a pair of hinge members pivotally connected to one another, with each hinge member having an abutting face, where the abutting faces contact one another when the frame is in the display condition.

5. The projection backwall system of claim 4 further including a plurality of central hinge assemblies disposed between adjacent frame members, each central hinge assembly having a locking pin movable between a locked position and a free position, when in the locked position, the adjacent frame members are canted outwardly with the plane creating an inside angle less than about 180 degrees.

6. The projection backwall system of claim 2 wherein the stretch-fabric screen is attached to the frame by a compression fit between a tab extending from the screen received within a channel in the frame members.

7. The projection backwall system of claim 2 wherein the stretch-fabric screen is attached to the frame by an interference fit created by a ridged tab extending from the screen received into a channel in the frame members and wherein the channel includes a mating recess to receive the ridged tab.

8. The projection backwall system of claim 1 wherein the projection screen further comprises a pair of feet removably attached to the frame at a lower end thereof.

9. The projection backwall system of claim 8 wherein the feet extend in a direction substantially perpendicular to the plane of the frame.

10. The projection backwall system of claim 1 wherein the frame comprises four corner hinge assemblies and two pairs of central hinge assemblies, wherein a first pair of central hinge assemblies have an axis of rotation parallel with an axis of rotation for the four corner hinge assemblies, and a second pair of central hinge assemblies have axis of rotation perpendicular to the axis of rotation for the four corner hinge assemblies.

11. The projection backwall system of claim 10 wherein the second pair of central hinge assemblies are positioned at a top side and a bottom side of the frame.

12. The projection backwall system of claim 1 wherein the projector is a short throw projector positioned behind the screen.

13. A collapsible display screen for use with a projector to create a large scale display, comprising:
a foldable frame comprising a plurality of frame members and a plurality of hinge assemblies, each of the frame members having recesses in the ends configured to receive corresponding legs of the plurality of hinge assemblies, wherein the foldable frame is movable to an erected configuration having a predetermined geometry;
a pair of feet removably attached to the foldable frame at a lower end thereof and oriented transverse to a plane formed by the foldable frame to thereby support the foldable frame;
a flexible fabric screen removably attached to the foldable frame, wherein the flexible fabric screen is sized slightly smaller than the predetermined geometry of the foldable frame thereby causing the flexible fabric screen to cooperate with the foldable frame to create tension which causes the flexible fabric screen to be held in a tight and substantially smooth manner; and
wherein the flexible fabric material is substantially rectangular and the predetermined geometry of the frame has sides bowed outwardly from parallel within the plane formed by the foldable frame when in the erected configuration.

14. The collapsible display screen of claim 13 wherein the plurality of hinge assemblies comprise corner hinge assemblies, wherein the corner hinge assemblies are movable between an extended position where the corresponding leg members are positioned slightly more than 90 degrees with respect to one another, and a collapsed position where the corresponding leg members are substantially parallel.

15. The collapsible display screen of claim 14 wherein the plurality of hinge assemblies further comprise middle hinge assemblies, wherein the middle hinge assemblies are movable between an extended position whereby the interior angle created by the leg members is slightly less that 180 degrees with respect to one another when the flexible fabric screen is not attached, and a collapsed position where the corresponding leg members are substantially parallel with one another.

16. The collapsible display screen of claim 15 wherein the middle hinge assemblies are lockable in the extended position.

17. The collapsible display screen of claim 16 wherein the flexible fabric screen causes the middle hinge assemblies to be to be pulled to an alignment wherein the interior angle created by the leg members is closer to 180 degrees than when the flexible fabric is not attached.

18. The collapsible display screen of claim 16 wherein the middle hinge assemblies further have a locking pin contained therein, wherein the locking pin is slidable between a locked position and an unlocked position.

19. The collapsible display screen of claim 13 wherein the feet comprise an elongated foot member having a mating opening centrally located therein, and a spring loaded pin, wherein the mating opening is configured to receive a locking pin attached to the frame through one portion thereof, and to allow the locking pin to be moved to a second locking portion thereof, wherein the spring loaded pin will retain the locking tab in the second locking portion of the opening.

20. A collapsible display screen for use with a projector to create a large scale display, comprising:
a foldable frame comprising a plurality of linear frame members, a plurality of corner hinge assemblies and a plurality of selectively lockable middle hinge assemblies, each of the linear frame members having recesses in the ends, each of the corner hinge assemblies having legs extending from each side thereof for insertion into an adjacent linear frame member, and each of the middle hinge assemblies having legs extending from each side thereof for insertion into adjacent frame members, wherein the frame members and the hinge assemblies form a continuous frame structure which is movable to an erected configuration having a predetermined geometry;
a pair of feet removably attached to the foldable frame at a lower end thereof and oriented transverse to a plane formed by the foldable frame to thereby support the foldable frame, the feet comprising an elongated foot member having a mating opening centrally located therein, and a flexible locking tab, wherein the mating opening is configured to receive a locking pin which is attached to the frame through one portion of the mating opening, and to allow the locking pin to be moved to a second locking portion of the mating opening, wherein the flexible locking tab will retain the locking tab in the second locking portion of the mating opening; and
a flexible fabric screen removably attached to the foldable frame, wherein the flexible fabric screen is sized slightly smaller than the predetermined geometry of the foldable frame thereby causing the flexible fabric screen to cooperate with the foldable frame to create tension causing the flexible fabric screen to be held in a tight and substantially smooth manner.

21. The collapsible display screen of claim 20 wherein the corner hinge assemblies are movable between an extended position where the corresponding leg members are positioned slightly more than 90 degrees with respect to one another, and a collapsed position where the corresponding leg members are substantially parallel, and wherein the middle hinge assemblies are movable between an extended position whereby the interior angle created by the leg members is slightly less that 180 degrees with respect to one another when the flexible fabric screen is not attached, and a collapsed position where the corresponding leg members are substantially parallel with one another; and wherein the flexible fabric screen is substantially rectangular such that attachment of the flexible fabric screen to the frame causes the frame to be pulled into a configuration substantially more rectangular than the predetermined geometry.

* * * * *